(12) United States Patent
Chen et al.

(10) Patent No.: US 12,130,467 B2
(45) Date of Patent: Oct. 29, 2024

(54) BACKLIGHT MODULE AND DISPLAY DEVICE

(71) Applicant: RADIANT OPTO-ELECTRONICS CORPORATION, Kaohsiung (TW)

(72) Inventors: Kuan-Feng Chen, Kaohsiung (TW); Che-Kai Chang, Kaohsiung (TW); Jyun-Siang Chen, Kaohsiung (TW); Chih-Chun Wang, Kaohsiung (TW)

(73) Assignee: RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

(21) Appl. No.: 18/538,413

(22) Filed: Dec. 13, 2023

(65) Prior Publication Data

US 2024/0272349 A1    Aug. 15, 2024

Related U.S. Application Data

(63) Continuation of application No. PCT/CN2023/087020, filed on Apr. 7, 2023.

(30) Foreign Application Priority Data

Feb. 14, 2023 (CN) .......................... 202310123036.8

(51) Int. Cl.
*F21V 8/00* (2006.01)
(52) U.S. Cl.
CPC ......... *G02B 6/0085* (2013.01); *G02B 6/0068* (2013.01); *G02B 6/0088* (2013.01)
(58) Field of Classification Search
CPC ................ G02B 6/0085; G02B 6/0068; G02B 6/0088
See application file for complete search history.

(56) References Cited

U.S. PATENT DOCUMENTS

| 10,823,908 B2 | 11/2020 | Zhong | |
|---|---|---|---|
| 2015/0036383 A1* | 2/2015 | Wu | G02B 6/0085 |
| | | | 362/611 |
| 2016/0041330 A1* | 2/2016 | Chen | G02B 6/0068 |
| | | | 362/611 |

FOREIGN PATENT DOCUMENTS

| CN | 202134572 | 2/2012 |
|---|---|---|
| CN | 103032848 | 4/2013 |

(Continued)

OTHER PUBLICATIONS

He et al., CN 101949526, Jan. 2011 (Year: 2011).*

*Primary Examiner* — Mary Ellen Bowman
(74) *Attorney, Agent, or Firm* — MUNCY, GEISSLER, OLDS & LOWE, P.C.

(57) ABSTRACT

A backlight module comprises a back plate, a light-guiding plate arranged at the back plate and a light source module. The light-guiding plate has an incident surface and an emitting surface connected to each other. The light source module has a base board and at least one light-emitting unit. The base board is disposed at the emitting surface of the light-guiding plate. The light-emitting unit is mounted at the base board and faces the incident surface of the light-guiding plate. The base board comprises an electrically-connecting portion and at least one heat dissipation portion. The electrically-connecting portion is electrically connected to the light-emitting unit. The heat dissipation portion extends from the electrically-connecting portion toward a direction away from the light-guiding plate without being electrically connected to the light-emitting unit. A display device having the backlight module is also provided.

13 Claims, 8 Drawing Sheets

(56) References Cited

FOREIGN PATENT DOCUMENTS

| | | |
|---|---|---|
| CN | 103148409 | 6/2013 |
| CN | 104054408 | 9/2014 |
| CN | 104062806 | 9/2014 |
| CN | 205157931 | 4/2016 |
| CN | 207037286 | 2/2018 |
| CN | 209914176 | 1/2020 |
| CN | 111638615 | 9/2020 |
| CN | 108458280 | 1/2021 |
| KR | 1020130022494 | 3/2013 |
| KR | 1020130073471 | 7/2013 |
| TW | 201435451 | 9/2014 |

* cited by examiner

BACKLIGHT MODULE AND DISPLAY DEVICE

CROSS-REFERENCE TO RELATED APPLICATIONS

This application is a continuation application of international Application No. PCT/CN2023/087020 filed on Apr. 7, 2023, which claims priority from China Patent Application Serial Number 202310123036.8, filed on Feb. 14, 2023. The entire contents of each of which are incorporated herein by reference.

BACKGROUND OF THE INVENTION

1. Field of the Invention

The present invention relates to a backlight module and a display device, and more particularly to a backlight module, having a heat dissipation effect and being beneficial to thin design, and a display device having said backlight module.

2. Description of Related Art

Development of a conventional backlight module nowadays pursues thin-and-narrow frames and high illumination. Higher illumination demand for higher heat dissipation capabilities. Due to the thin-and-narrow frames of the conventional backlight module, there is no additional room for passive heat-dissipation elements.

A conventional way to dissipate waste heat in a back light module is a graphite sheet pasted on the light source module. However, the graphite sheet increases a thickness of the light source module, and it is disadvantageous for thin design. Besides, higher material cost of the graphite sheet and an additional mounting step in an assembling process of the conventional backlight module cause an increased total cost and therefore need to be improved.

SUMMARY OF THE INVENTION

The main objective of the present invention is to provide a backlight module and a display device to resolve drawbacks about the conventional heat dissipation by adding graphite sheets which is disadvantageous to thin design and is costly.

The backlight module comprises a back plate, a light-guiding plate and a light source module. The light-guiding plate is arranged at the back plate and comprises an incident surface and an emitting surface connected to the incident surface. The light source module comprises a base board and at least one light-emitting unit. The base board is disposed at the emitting surface of the light-guiding plate. The at least one light-emitting unit is mounted at the base board and faces the incident surface of the light-guiding plate. The base board comprises an electrically-connecting portion and at least one heat dissipation portion. The electrically-connecting portion is electrically connected to the at least one light-emitting unit. The at least one heat dissipation portion is electrically disconnected from the at least one light-emitting unit and extends from the electrically-connecting portion toward a direction that is away from the light-guiding plate.

The electrically-connecting portion of the base board of the light source module is electrically connected to the at least one light-emitting unit. By the at least one heat dissipation portion connected to the electrically-connecting portion of the base board, accumulated heat from the at least one light-emitting unit and the electrically-connecting portion is dissipated via conduction of the at least one heat dissipation portion. Besides, the at least one heat dissipation portion is a part of the base board, hence, additional graphite sheets and graphite sheet pasting steps are saved, therefore saving costs thereof and being beneficial to thin design.

In addition, the at least one heat dissipation portion can contact the back plate or other components in the backlight module to conduct the heat to other components for dispersing the heat in the backlight module, thereby enhancing heat dissipation effect.

The display device in accordance to the present invention comprises the aforementioned backlight module and a display panel. The display panel is mounted at the backlight module. The emitting surface of the light-guiding plate faces the display panel.

Applied with the backlight module, a better heat dissipation effect and a thin design of the display device as well as a lower manufacture cost can be achieved at the same time.

DETAILED DESCRIPTION OF THE PREFERRED EMBODIMENT

Figure 1:
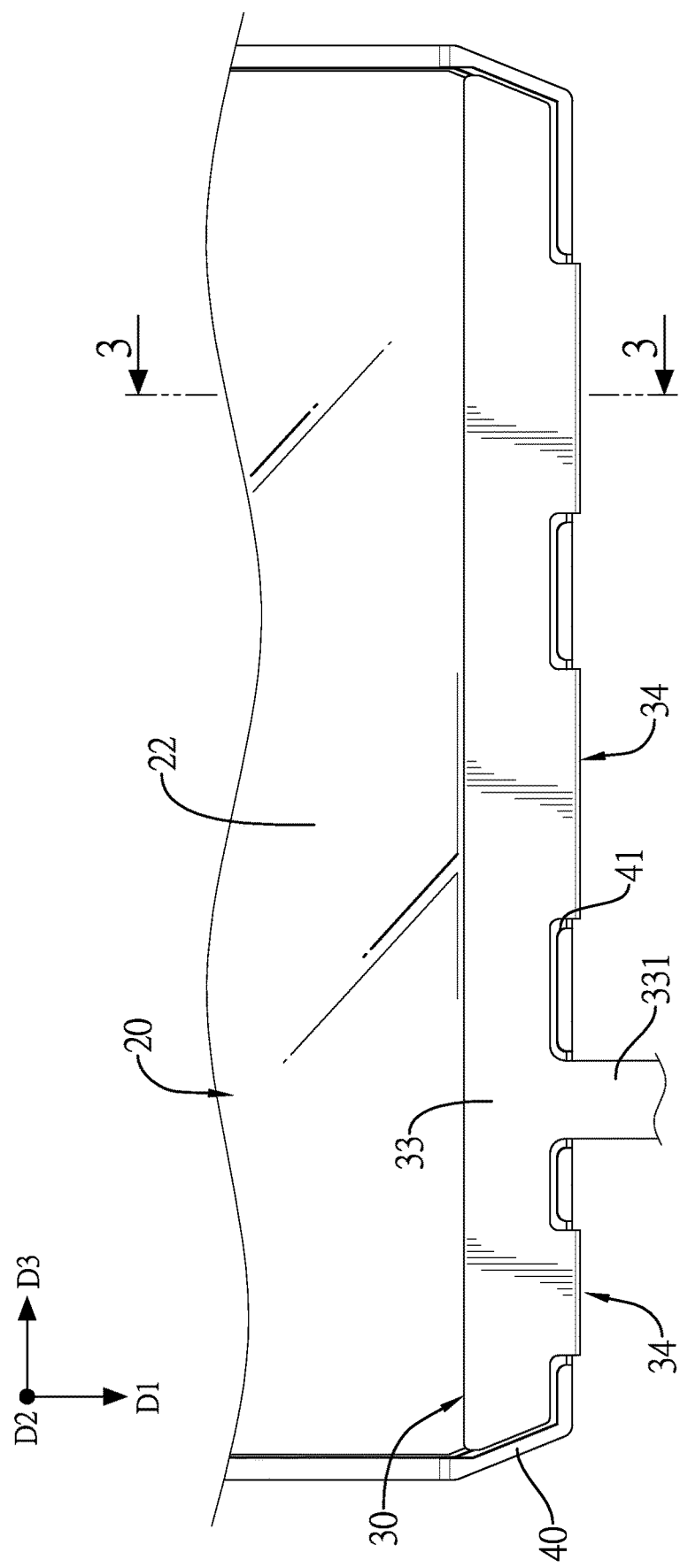
FIG. 1 is an enlarged top view of a first embodiment of a backlight module in accordance with the present invention.

With reference to FIGS. 1, 3, 5 and 6, several embodiments of a backlight module in accordance with the present invention are shown. The backlight module comprises a back plate 10, a light-guiding plate 20 and a light source module 30.

As shown in FIGS. 1 to 4, in a first embodiment of the present invention, the light-guiding plate 20 is arranged at the back plate 10. The light-guiding plate 20 comprises an incident surface 21 and an emitting surface 22 connected to the incident surface 21.

Figure 3:
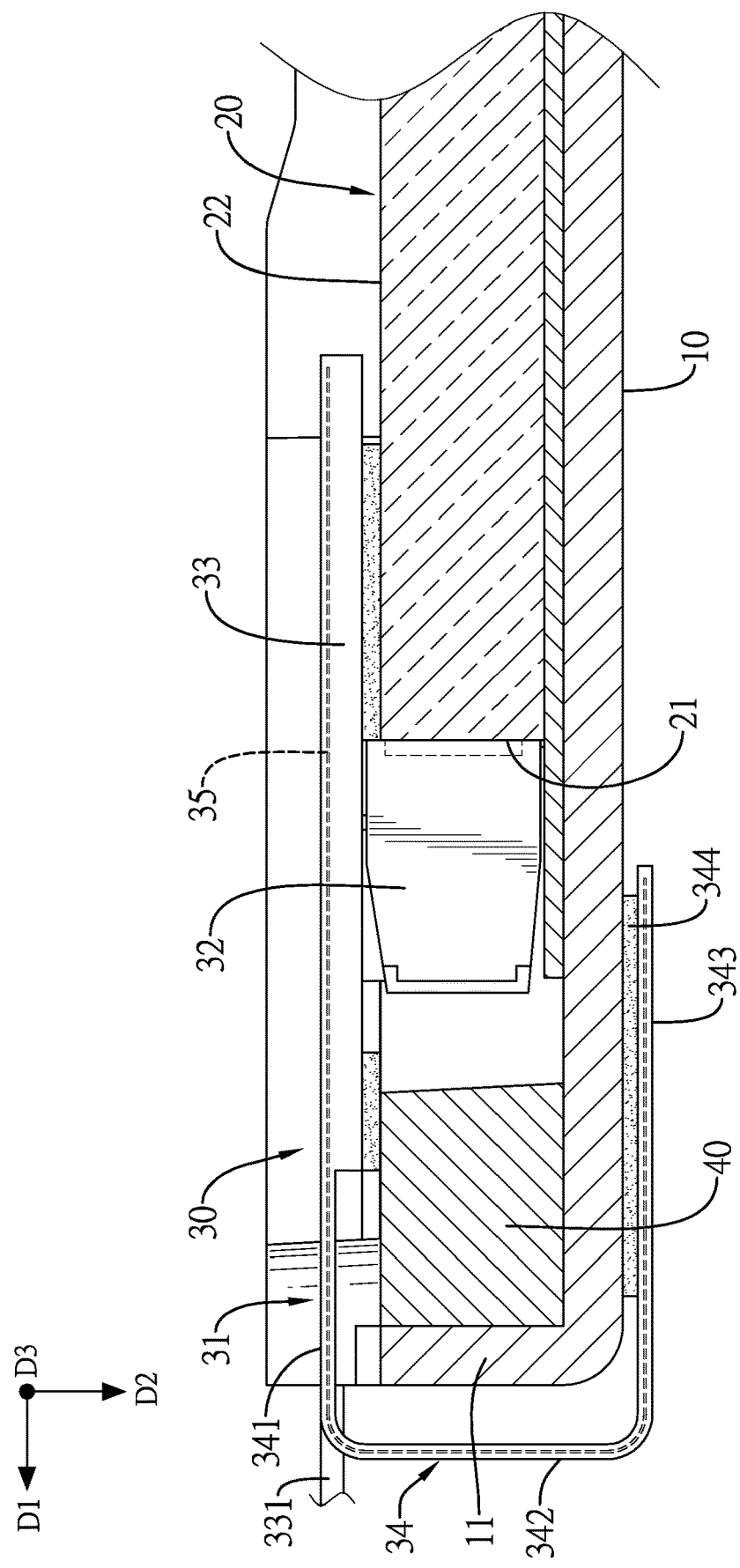
FIG. 3 is an enlarged side view in partial section along line A-A in FIG. 1.
Figure 4:
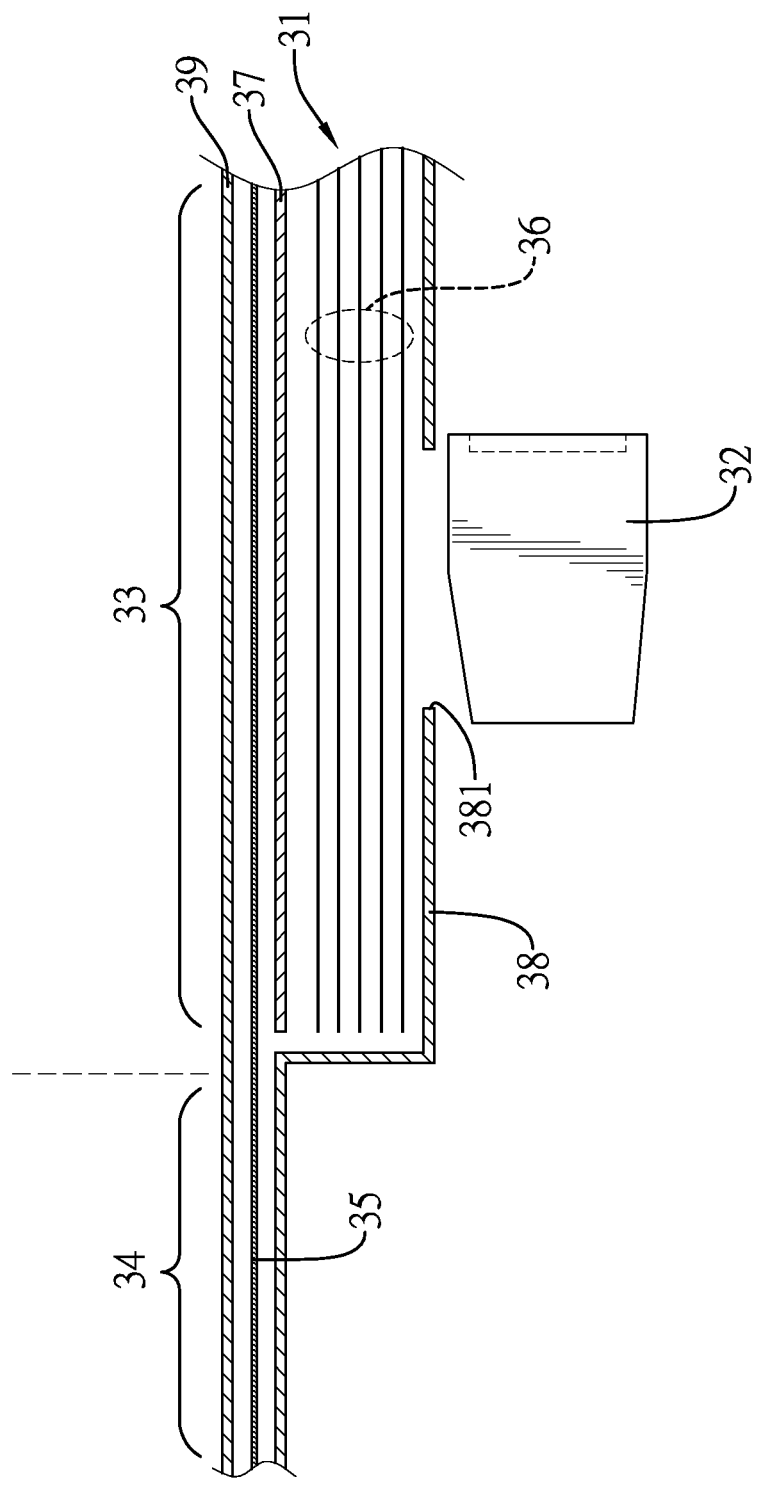
FIG. 4 depicts inner configurations of a base board of the backlight module in FIG. 1.

As shown in FIGS. 3 and 4, the light source module 30 comprises a base board 31 and at least one light-emitting unit 32. The base board 31 is disposed at the emitting surface 22 of the light-guiding plate 20. The at least one light-emitting unit 32 is mounted at the base board 31 and faces the incident surface 21 of the light-guiding plate 20.

Further, the base board 31 comprises an electrically-connecting portion 33 and at least one heat dissipation portion 34. The electrically-connecting portion 33 is electrically connected to the at least one light-emitting unit 32. The at least one heat dissipation portion 34 is electrically disconnected to the at least one light-emitting unit 32 and extends from the electrically-connecting portion 33 toward a direction that is away from the light-guiding plate 20.

The accumulated heat of the at least one light-emitting unit 32 and the electrically-connecting portion 33 in the present invention can be dispersed by the at least one heat dissipation portion 34 of the base board 31 of the light source module 30 extending from the electrically-connecting portion 33 toward the direction away from the light-guiding plate 20. Besides, the at least one heat dissipation portion 34 is a part of the base board 31, hence, additional graphite sheets and graphite sheet pasting steps could be saved so as to lower costs and thin design.

Figure 5:
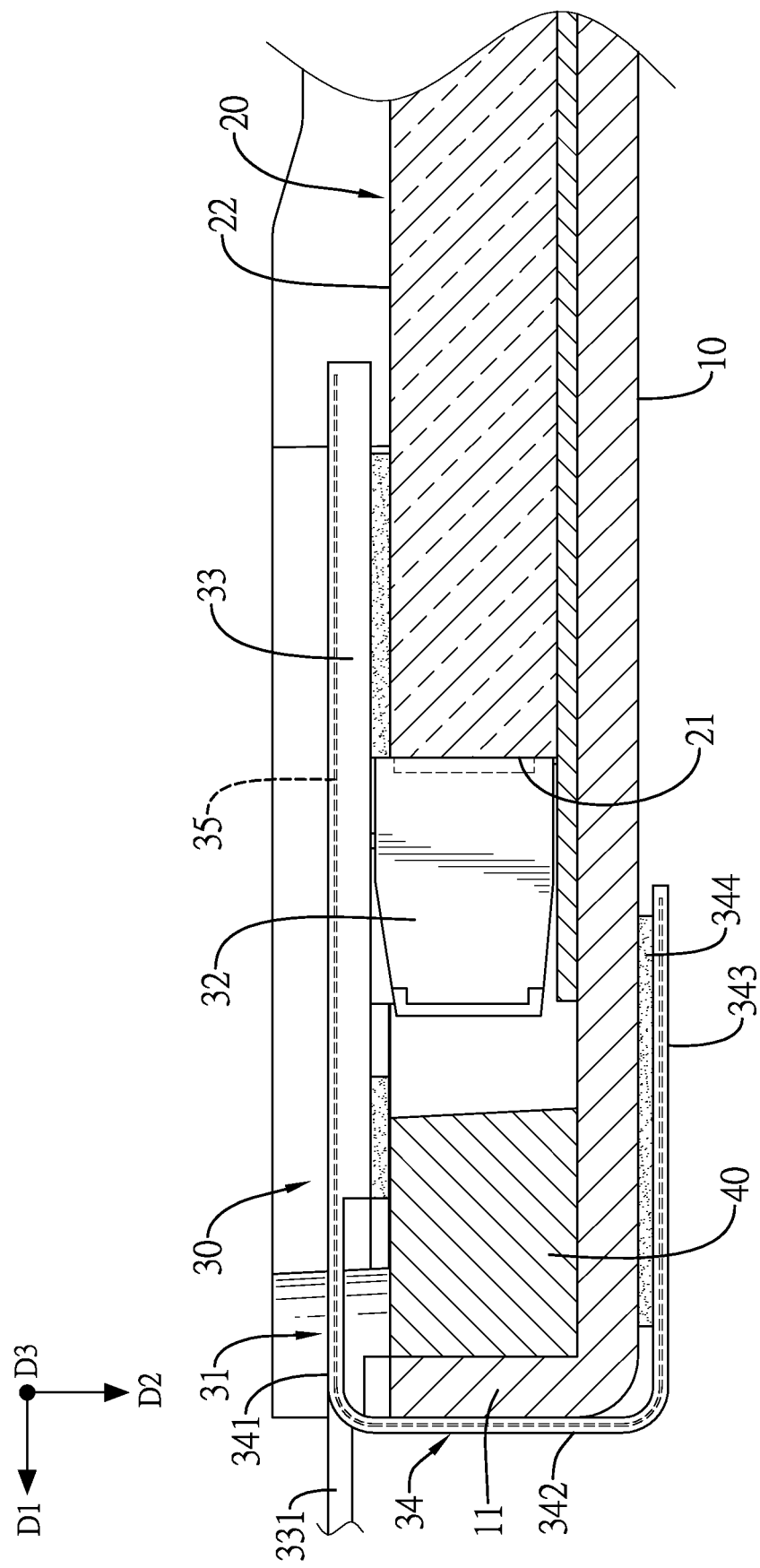
FIG. 5 is an enlarged side view in partial section of a second embodiment of the backlight module in accordance with the present invention.

With reference to FIGS. 3 and 5, connecting positions of the at least one heat dissipation portion 34 and the back plate 10 of several embodiments of the present invention are shown. A larger contact area of the at least one heat dissipation portion 34 with other components in the backlight module leads to a better heat dissipation effect. Preferably, with reference to FIG. 3, the at least one heat dissipation portion 34 is connected to the back plate 10 to conduct heat to the back plate 10, thereby dissipating the heat via the back plate 10. Moreover, the at least one heat dissipation portion 34 may contact other components of the backlight module, such as thermal adhesive 344 to enhance the heat dissipation effect. Preferably, the at least one heat dissipation portion 34 extends from the electrically-connecting portion 33 toward the direction away from the light-guiding plate 20 and is connected to the back plate 10 in order to prevent the at least one heat dissipation portion 34 from covering the emitting surface 22 of the light-guiding plate 20 and harming optical quality, and to dissipate the heat outwardly from the backlight module for better heat dissipation effect.

Figure 6:
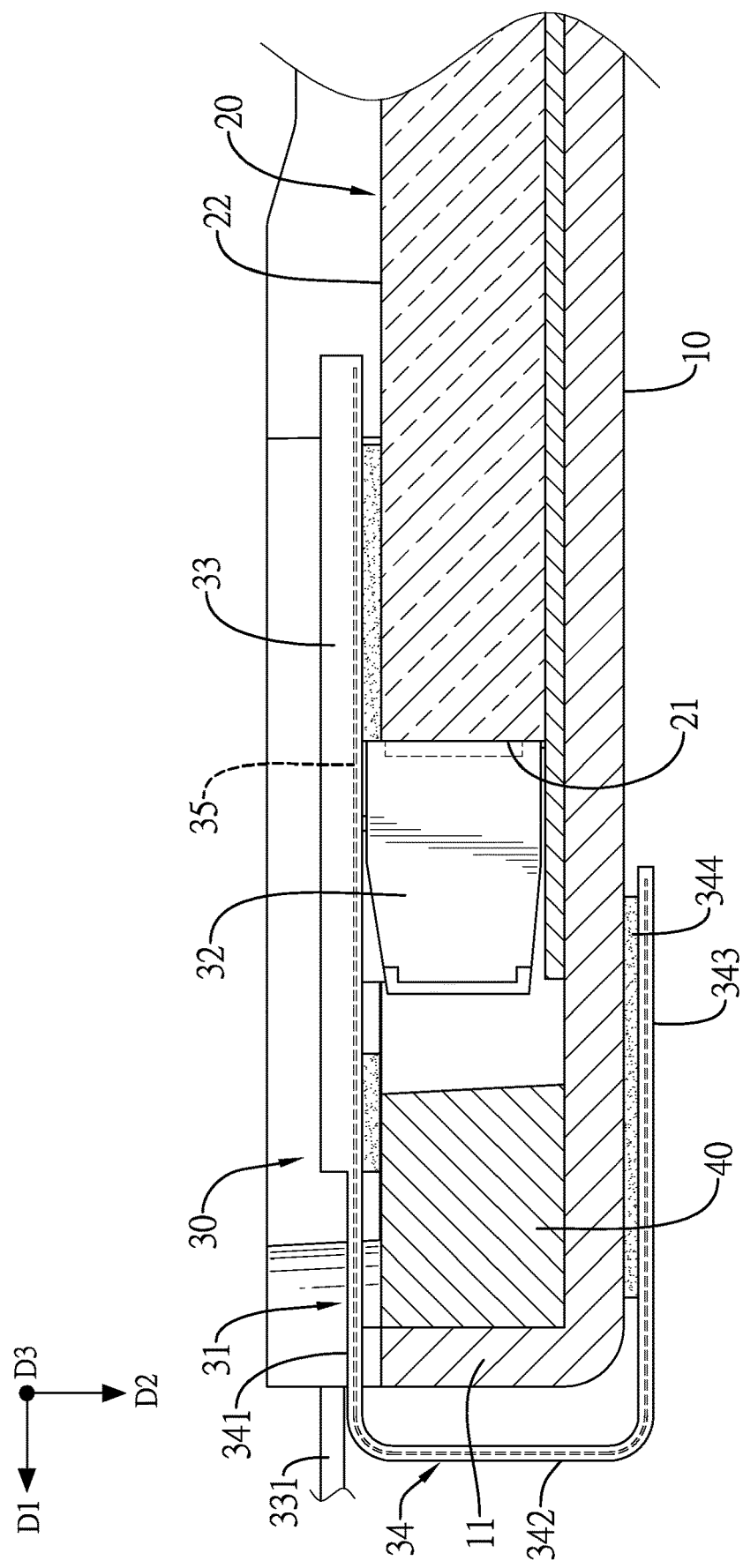
FIG. 6 is an enlarged side view in partial section of a third embodiment of the backlight module in accordance with the present invention.

With reference to FIGS. 3, 5 and 6, the at least one heat dissipation portion 34 has a connecting section 341 and a first extending section 342 connected in sequence. The connecting section 341 is connected to the electrically-connecting portion 33 along a first direction D1. The first extending section 342 extends along a second direction D2. The first direction D1 and the second direction D2 are non-parallel. The first extending section 342 may contact other components of the backlight module as well, such as the back plate 10. The at least one heat dissipation portion 34 further has a second extending section 343 connected to the first extending section 342. The second extending section 343 extends along a direction being different from a direction along which the first extending section 342 extends, i.e. the second direction D2. The contact area of the at least one heat dissipation portion 34 with other components is increased by arrangement of the first extending section 342 and the second extending section 343, and it is helpful to provide the at least one heat dissipation portion 34 with more structural design varieties.

For example, as shown in FIG. 3, in the first embodiment of the present invention, the connecting section 341 protrudes from the back plate 10, the first extending section 342 is spaced from a side wall 11 of the back plate 10, and the second extending section 343 is connected to a back side of the back plate 10 in surface contact. Alternatively, as shown in FIG. 5, in a second embodiment of the present invention, the first extending section 342 contacts the side wall 11 of the back plate 10 and the second extending section 343 is connected to the back side of the back plate 10 in surface contact. The first extending section 342 and the second extending section 343 may be respectively connected to different components of the backlight module. The at least one heat dissipation portion 34 may be adhered to an inner side of the back plate 10 to provide the above-mentioned heat dissipation effect. To sum up, as long as a part of the at least one heat dissipation portion 34 is adhered to a component, which allows heat to be dissipated outwardly, e.g. the back plate 10, the heat dissipation effect can be achieved. In an alternative embodiment of the present invention that the at least one heat dissipation portion 34 only has the first extending section 342 and lacks the second extending section 343, the heat dissipation effect of the at least one heat dissipation portion 34 is still assured via the first extending section 342.

Besides, the at least one heat dissipation portion 34 is preferably one-piece formed. The connecting section 341 of the at least one heat dissipation portion 34 is connected to the first extending section 342 through a bend. The first extending section 342 and the second extending section 343 are connected to each other through another bend. Therefore, the connecting section 341, the first extending section 342 and the second extending section 343 respectively extend in different directions. The first direction D1 and the second direction D2 are adjustable according to structural designs of the backlight module. In the preferable embodiment of the present invention, the side wall 11 is perpendicular to the back side of the back plate 10, so the first direction D1 and the second direction D2 are perpendicular to each other. In other embodiments of the present invention, if the side wall 11 or the back side of the back plate 10 is arched, then the at least one heat dissipation portion 34 can be adhered to a surface of the back plate 10 and accordingly is arched.

Furthermore, with reference to FIG. 3, the incident surface 21 of the light-guiding plate 20 is located at a lateral side of the light-guiding plate 20. The emitting surface 22 is located at a top side of the light-guiding plate 20. The at least one light-emitting unit 32 of the light source module 30 is disposed between the incident surface 21 of the light-guiding plate 20 and the side wall 11 of the back plate 10. The base board 31 located at a top side of the at least one light-emitting unit 32 facilitates the at least one heat dissipation portion 34 to go over the side wall 11 of the back plate 10 and extend outwardly.

Figure 2:
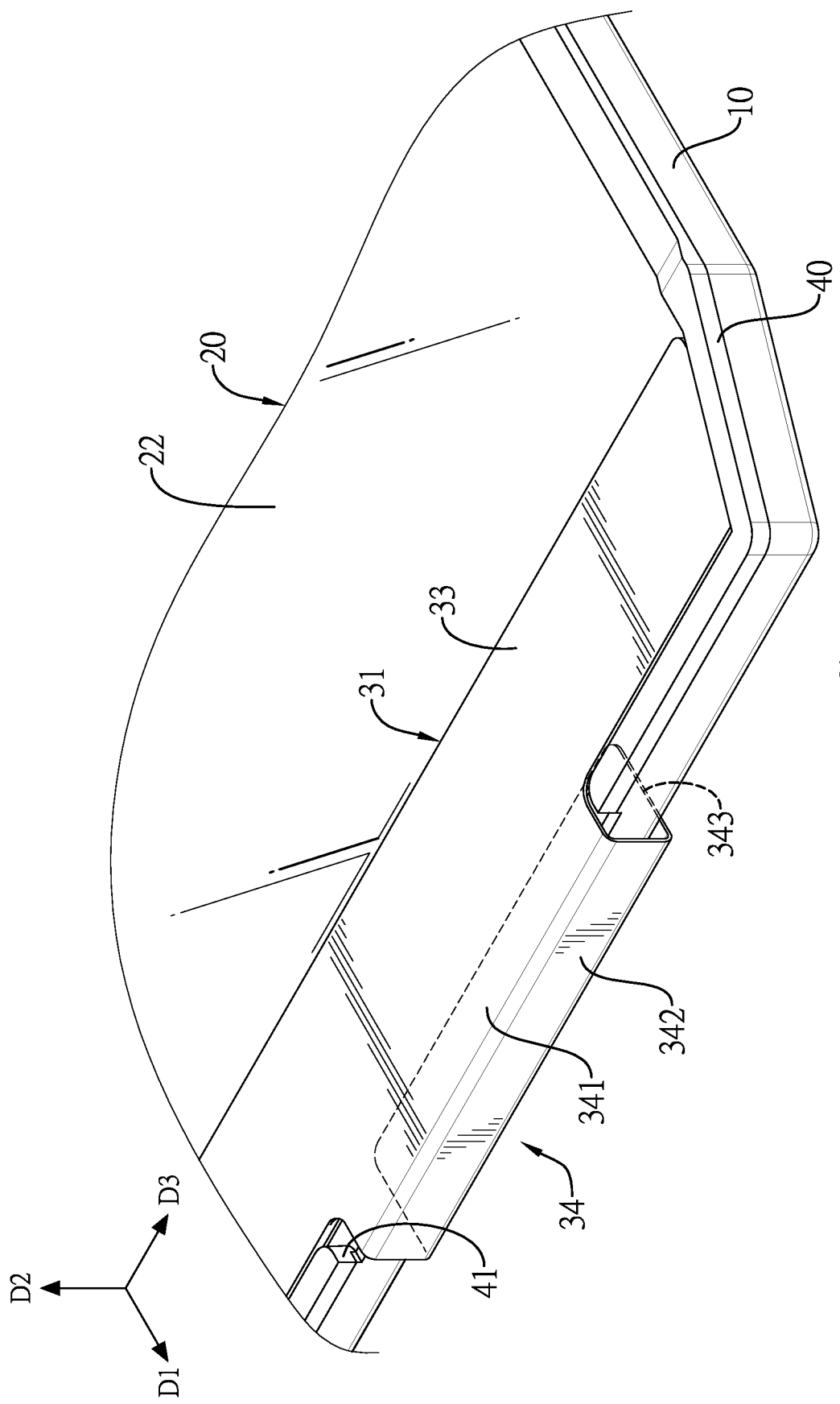
FIG. 2 is an enlarged perspective view of the backlight module in FIG. 1.

With reference to FIGS. 1 to 3, the at least one light-emitting unit 32 extends along a lengthwise direction D3. The electrically-connecting portion 33 extends along the lengthwise direction D3 and covers the at least one light-emitting unit 32. The at least one heat dissipation portion 34 extends along the first direction D1 from the electrically-connecting portion 33 toward the direction away from the light-guiding plate 20. The first direction D1 and the lengthwise direction D3 are non-parallel to each other. Specifically, the at least one heat dissipation portion 34 covers the electrically-connecting portion 33 and extends along the lengthwise direction D3, conducting heat from different positions of the electrically-connecting portion 33 along the lengthwise direction D3, and thus enhancing heat dissipation efficiency. There is other option as shown in FIG. 1, when the base board 31 has multiple said heat dissipation portions 34, the multiple heat dissipation portions 34 are arranged along the lengthwise direction D3 at spaced intervals. Therefore, a space is formed between each two of the multiple heat dissipation portions 34 for accommodating other mechanisms of the backlight module, so the multiple heat dissipation portions 34 are capable of dissipating heat effectively.

Figure 7:
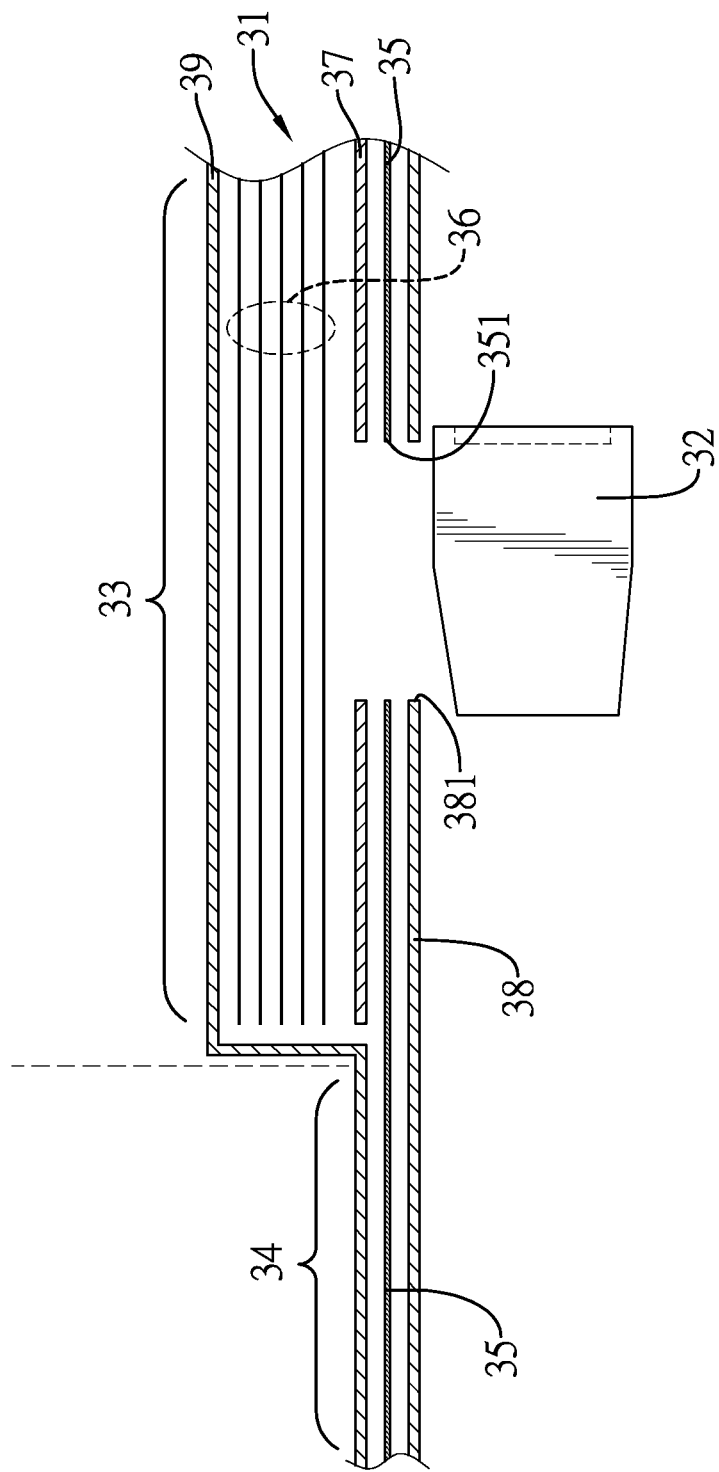
FIG. 7 depicts inner configurations of a base board of the backlight module in FIG. 6.

As shown in FIGS. 3, 4, 6 and 7, the base board 31 comprises a heat conduction layer 35 arranging throughout the electrically-connecting portion 33 and the at least one heat dissipation portion 34. The electrically-connecting portion 33 has an electrically-conductive layer 36. The electrically-conductive layer 36 is insulated from the heat conduction layer 35 and extends within the electrically-connecting portion 33 without entering the at least one heat dissipation portion 34. Additionally, the electrically-conductive layer 36 is electrically connected to the at least at least one light-emitting unit 32 to control and supply power to the at least at least one light-emitting unit 32. For example, the heat conduction layer 35 extends from an interior of the electrically-connecting portion 33 to the at least one heat dissipation portion 34, making heat of the electrically-connecting portion 33 of the base board 31 and the electrically-conductive layer 36 easier to be conducted to the at least one heat dissipation portion 34, thereby enhancing the heat dissipation effect. In addition, the heat conduction layer 35 inside the electrically-connecting portion 33 covers the at least one light-emitting unit 32, so heat of the at least one light-emitting unit 32 is easier to be conducted. With reference to FIGS. 4 and 7, the electrically-connecting portion 33 further comprises an insulation layer 37 disposed between the heat conduction layer 35 and the electrically-conductive layer 36 to ensure the heat conduction layer 35 is electrically insulated, thereby preventing electrical interference. Besides, the electrically-connecting portion 33 shown in FIG. 1 further comprises an electrically-conductive extending portion 331 served as an external power connector for the light source module 30. Therefore, the heat conduction layer 35 dissipates heat only via the at least one heat dissipation portion 34 and does not overlap with the electrically-conductive extending portion 331 so as to prevent extra heat being accumulated in the electrically-conductive extending portion 331.

To conduct the heat generated by the at least one light-emitting unit 32 and the electrically-conductive layer 36 through the heat conduction layer 35, there is an option that the at least one light-emitting unit 32 and the heat conduction layer 35 are arranged at the same surface of the electrically-conductive layer 36 as shown in FIGS. 3 and 4. There is another option that the heat conduction layer 35 can be arranged at one of two sides of the electrically-conductive layer 36 while the at least one light-emitting unit 32 is arranged at the other side of the electrically-conductive layer 36 of a third embodiment of the present invention as shown in FIGS. 6 and 7. Because the heat conduction layer 35 of the third embodiment is located nearer to the at least one light-emitting unit 32, which is a main heat source of the backlight module, the third embodiment has a better heat dissipation efficiency.

Preferably, an area of the heat conduction layer 35 is larger than an area of the electrically-conductive layer 36, thereby enhancing the heat dissipation effect. Furthermore, the heat conduction layer 35 covers the electrically-conductive layer 36 to conduct the heat of the electrically-conductive layer 36 to external environment as much as possible.

Besides, a thickness of the at least one heat dissipation portion 34 is preferably smaller than a thickness of the electrically-connecting portion 33. The at least one heat dissipation portion 34 is used to dissipate heat and does not have electrical connection functions. In other words, the electrically-connecting portion 33 has the electrically-conductive layer 36 but the at least one heat dissipation portion 34 does not, so the thickness of the at least one heat dissipation portion 34 can be smaller than the thickness of the electrically-connecting portion 33, thereby advantaging for thin design of the backlight module. In addition, the at least one heat dissipation portion 34 is connected to the side wall 11 or the back side of the back plate 10 along a different extending direction in respect to an extending direction of the electrically-connecting portion 33. Therefore, the at least one heat dissipation portion 34, which has a thinner thickness, is prone to be bended for reducing stress concentration to avoid fracture. To make the at least one heat dissipation portion 34 easier to be bended for reducing stress concentration, materials of the at least one heat dissipation portion 34 are preferably metal, especially metal with higher thermal conductivity and higher ductility, such as copper. Since adding a bendable copper layer to an original Flexible Printed Circuit, instead of adding high-cost graphite sheets, a manufacture cost of the present invention is reduced.

As shown in FIGS. 4 and 7, the base board 31 further comprises a first protection layer 38. The first protection layer 38 is arranged at a side of the at least one light-emitting unit 32. Preferably, the first protection layer 38 integrally covers the electrically-connecting portion 33 and an outside of the at least one heat dissipation portion 34, so that the electrically-connecting portion 33 and the at least one heat dissipation portion 34 of the base board 31 of the light source module 30 are one-piece formed, thereby enhancing the heat dissipation effect and reducing assembly steps. Besides, there is an option that the base board 31 further comprises a second protection layer 39 disposed at a side of the base board 31 that is away from the at least one light-emitting unit 32. In a region of the electrically-connecting portion 33, the heat conduction layer 35 and the electrically-conductive layer 36 are disposed between the first protection layer 38 and the second protection layer 39. In a region of the at least one heat dissipation portion 34, the heat conduction layer 35 extends from the electrically-connecting portion 33 to an interior of the at least one heat dissipation portion 34, that is, the heat conduction layer 35 is disposed between the first protection layer 38 and the second protection layer 39, thereby the heat conduction layer 35 is protected and is not prone to oxidization. There is another option that the heat conduction layer 35 extends from the electrically-connecting portion 33 to an exterior of the at least one heat dissipation portion 34 and connects the at least one heat dissipation portion 34. The heat conduction efficiency in both way, the heat conduction layer 35 extending to the interior or the exterior of the at least one heat dissipation portion 34 remains good.

In addition, the first protection layer 38 forms at least one communication hole 381. As shown in FIG. 4, in the first embodiment of the present invention, the electrically-conductive layer 36 is disposed between the first protection layer 38 and the heat conduction layer 35, and the at least one light-emitting unit 32 passes through the at least one communication hole 381 and is electrically connected to the electrically-conductive layer 36. As shown in FIGS. 6 and 7, in the third embodiment of the present invention, the heat conduction layer 35 is disposed between the first protection layer 38 and the electrically-conductive layer 36. The heat conduction layer 35 has at least one opening 351. The at least one light-emitting unit 32 passes through the at least one communication hole 381 and the at least one opening 351 and is electrically connected to the electrically-conductive layer 36. In the first embodiment of the present invention, because the heat conduction layer 35 of the base board 31 is disposed at a side, which is away from the at least one light-emitting unit 32, of the electrically-conductive layer 36, the heat conduction layer 35 does not affect electrical connecting function of the electrically-conductive layer 36, hence manufacturing the light source module 30 is easier. Alternatively, in the third embodiment of the present invention, the heat conduction layer 35 of the base board 31 is disposed at a side, which is adjacent to the at least one light-emitting unit 32, of the electrically-conductive layer 36, so the heat conduction layer 35 needs to have at least one opening 351 for the at least one light-emitting unit 32 to electrically connect to the electrically-conductive layer 36. The heat conduction layer 35 does not electrically connect to the electrically-conductive layer 36. Since the heat conduction layer 35 is relatively close to the at least one light-emitting unit 32, the heat generated by the at least one light-emitting unit 32 is more easily conducted to the at least one heat dissipation portion 34 by the heat conduction layer 35, thereby the third embodiment of the present invention has a better heat dissipation effect.

Furthermore, as shown in FIGS. 1 and 2, the backlight module comprises a frame 40 mounted at the back plate 10. The light-guiding plate 20 and the at least one light-emitting unit 32 are encircled by the frame 40. In an embodiment of the present invention that the at least one heat dissipation portion 34 is connected to the side wall 11 or the back side of the back plate 10, and the frame 40 has at least one entrance 41. The at least one heat dissipation portion 34 corresponds to the at least one entrance 41, extends through the frame 40, and connects to the back plate 10.

Additionally, compared to a conventional backlight module, which comprises a base board of a light source module that does not have any heat dissipation portion, temperature of the at least one light-emitting unit 32 of the backlight module in accordance with the present invention is 1.3 Celsius degrees lower, so the backlight module of the present invention does have the heat dissipation effect.

Figure 8:
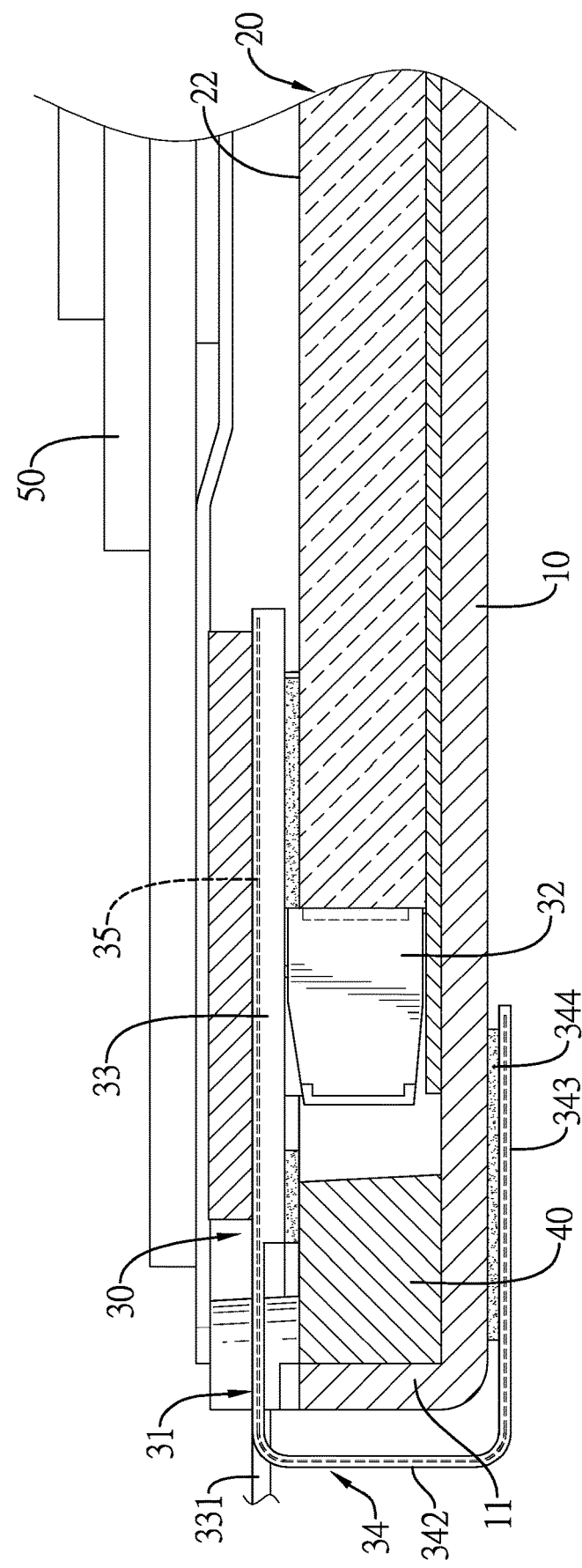
FIG. 8 is an enlarged side view in partial section of an embodiment of a display device in accordance with the present invention.

With reference to FIG. 8, a display device in accordance to the present invention comprises the backlight module and a display panel 50. The display panel 50 is mounted at the backlight module. The emitting surface 22 of the light-guiding plate 20 faces the display panel 50, which can be carried on the frame 40. Applied with the backlight module, the display device has the heat dissipation effect and the thin design, and can lower a manufacture cost at the same time.

In summary, the electrically-connecting portion 33 of the base board 31 of the light source module 30 of the backlight module is electrically connected to the at least one light-emitting unit 32. The at least one heat dissipation portion 34 connects the electrically-connecting portion 33 and extends along the direction away from the light-guiding plate 20. Hence, the at least one heat dissipation portion 34 conducts the heat generated by the at least one light-emitting unit 32, thereby dissipating heat. Because adding the graphite sheets on the base board 31 is unnecessary, assembling steps are reduced, the total cost is lowered, and the thickness of the backlight module will not be increased, hence being advantageous to thin design.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A backlight module comprising:
   a light-guiding plate having
      an incident surface; and
      an emitting surface connected to the incident surface; and
   a light source module comprising
      a base board disposed at the emitting surface of the light-guiding plate; and
      at least one light-emitting unit mounted at the base board and facing the incident surface of the light-guiding plate;
   wherein the base board comprises
      an electrically-connecting portion electrically connected to the at least one light-emitting unit; and
      at least one heat dissipation portion electrically disconnected from the at least one light-emitting unit and extending from the electrically-connecting portion toward a direction that is away from the light-guiding plate; wherein
   the base board comprises a heat conduction layer extending from an interior of the electrically-connecting portion to the at least one heat dissipation portion; and
   the electrically-connecting portion has an electrically-conductive layer being insulated from the heat conduction layer and extending within the electrically-connecting portion without entering the at least one heat dissipation portion.

2. The backlight module as claimed in claim 1, wherein the base board comprises a heat conduction layer extending from an interior of the electrically-connecting portion to an interior of the at least one heat dissipation portion.

3. The backlight module as claimed in claim 1, wherein the base board comprises a heat conduction layer extending from an interior of the electrically-connecting portion to an exterior of the at least one heat dissipation portion.

4. The backlight module as claimed in claim 1, wherein the backlight module comprises a back plate, the light-guiding plate is arranged at the back plate, and the at least one heat dissipation portion extends from the electrically-connecting portion toward the direction that is away from the light-guiding plate and is connected to the back plate.

5. The backlight module as claimed in claim 1, wherein
   the backlight module further comprises a back plate and a frame mounted at the back plate;
   the light-guiding plate is arranged at the back plate;
   the light-guiding plate and the at least one light-emitting unit are encircled by the frame; and
   the at least one heat dissipation portion extends out of the frame and is connected to the back plate.

6. The backlight module as claimed in claim 1, wherein
   the base board further comprises a first protection layer mounted at a side of the at least one light-emitting unit and covering the electrically-conductive layer and the heat conduction layer; and
   the electrically-conductive layer is disposed between the first protection layer and the heat conduction layer.

7. The backlight module as claimed in claim 1, wherein
   the base board further comprises a first protection layer mounted at a side of the at least one light-emitting unit and covering the electrically-conductive layer and the heat conduction layer;
   the heat conduction layer is disposed between the first protection layer and the electrically-conductive layer, and has at least one opening; and
   the at least one light-emitting unit passes through the at least one opening and is electrically connected to the electrically-conductive layer.

8. The backlight module as claimed in claim 1, wherein an area of the heat conduction layer is larger than an area of the electrically-conductive layer.

9. The backlight module as claimed in claim 1, wherein
the at least one heat dissipation portion is connected to the electrically-connecting portion along a first direction;
the at least one light-emitting unit extends along a lengthwise direction;
the electrically-connecting portion extends along the lengthwise direction and covers the at least one light-emitting unit; and
the first direction and the lengthwise direction are non-parallel.

10. The backlight module as claimed in claim 1, wherein a thickness of the at least one heat dissipation portion is smaller than a thickness of the electrically-connecting portion.

11. The backlight module as claimed in claim 1, wherein
the backlight module comprises a back plate;
the light-guiding plate is arranged at the back plate;
the at least one heat dissipation portion has a connecting section and a first extending section connected in sequence;
the connecting section is connected to the electrically-connecting portion along a first direction;
the first extending section extends along a second direction to connect the back plate; and
the first direction and the second direction are non-parallel.

12. The backlight module as claimed in claim 11, wherein
the at least one heat dissipation portion has a second extending section connected between the first extending section and the back plate; and
the second extending section extends along a direction being different from the second direction.

13. A display device comprising:
the backlight module as claimed in claim 1; and
a display panel mounted at the backlight module, wherein the emitting surface of the light-guiding plate faces the display panel.

* * * * *